United States Patent
Jmill

[19]

[11] Patent Number: 5,857,238
[45] Date of Patent: Jan. 12, 1999

[54] CLEANING DEVICE FOR VEHICLE TIRES

[76] Inventor: Daria Jmill, 325 Laurel Ave., Apt. 108, St. Paul, Minn. 55102-2137

[21] Appl. No.: 823,818

[22] Filed: Mar. 24, 1997

Related U.S. Application Data

[60] Provisional application No. 60/014,265 Mar. 28, 1996.

[51] Int. Cl. [6] .................................................. A46B 15/00
[52] U.S. Cl. ........................ 15/256.5; 15/88.1; 15/244.1
[58] Field of Search .......................... 15/88.1, 160, 53.4, 15/244.1, 256.5, 256.51; 280/855, 856

[56] References Cited

U.S. PATENT DOCUMENTS

| | | |
|---|---|---|
| D. 278,390 | 4/1985 | Bailey . |
| 317,603 | 5/1885 | Wilson et al. ........................... 15/88.1 |
| 1,329,694 | 3/1920 | Beck . |
| 2,960,337 | 11/1960 | Johnson . |
| 3,048,866 | 8/1962 | Thompson ................................ 15/53.4 |
| 3,231,293 | 1/1966 | Loustaunau . |
| 4,605,239 | 8/1986 | Warfel . |
| 5,430,906 | 7/1995 | Drury ........................................ 15/160 |
| 5,566,420 | 10/1996 | Specht .................................... 15/256.5 |

FOREIGN PATENT DOCUMENTS

| | | | |
|---|---|---|---|
| 2627139 | 8/1989 | France ...................................... 15/160 |
| 44447 | 4/1909 | Switzerland ............................ 280/855 |
| 20545 | 1/1904 | United Kingdom .................... 280/855 |

*Primary Examiner*—Terrence Till
*Attorney, Agent, or Firm*—Faegre & Benson LLP

[57] ABSTRACT

The present invention is a cleaning device assembly for vehicle tires, including a disposable cleaning cartridge, a shell, a connecting arm, and means for securing the connecting arm to a vehicle. The cleaning cartridge fits snugly over a vehicle tires, and is adjustable to accommodate tires of various widths. The cartridge includes a bristle brush or sponge liner for removing debris from a tire, and is secured to the shell with an adhesive or other means. The shell is adjustable relative to the connecting arm, which is further adjustable relative to the vehicle on which the invention is mounted.

16 Claims, 6 Drawing Sheets

CLEANING DEVICE FOR VEHICLE TIRES

This application claims the benefit of U.S. Provisional Application No. 60/014,265 filed Mar. 28, 1996.

TECHNICAL FIELD

The present invention relates to cleaning devices for wheels and tires of vehicles.

BACKGROUND OF THE INVENTION

In connection with the operation and use of a number of wheeled vehicles there are often problems encountered due to the tendency of the tires of such vehicles to pick up debris in one location and move the debris into other locations where it is not desired. Removal of the debris using conventional means including manual removal is often time consuming and laborious.

SUMMARY OF THE INVENTION

My invention is a cleaning device assembly mountable on a vehicle for frictional removal of debris from the tires as the wheels are rotated. The cleaning device assembly includes a cartridge having a cleaning element for removing debris from a tire, and a shell mounted on the cartridge. A longitudinally extendible rod having first and second members is attached to the shell. The second member includes a hollow chamber adapted to receive the first member, and a fastener secures the first member to the second member. A coupling secures the second member of the rod to the vehicle.

BRIEF DESCRIPTION OF THE DRAWINGS

The invention will be further described with reference to the accompanying drawings, in which.

DETAILED DESCRIPTION OF THE INVENTION

Figures 1, 2, 3, 4, 5:
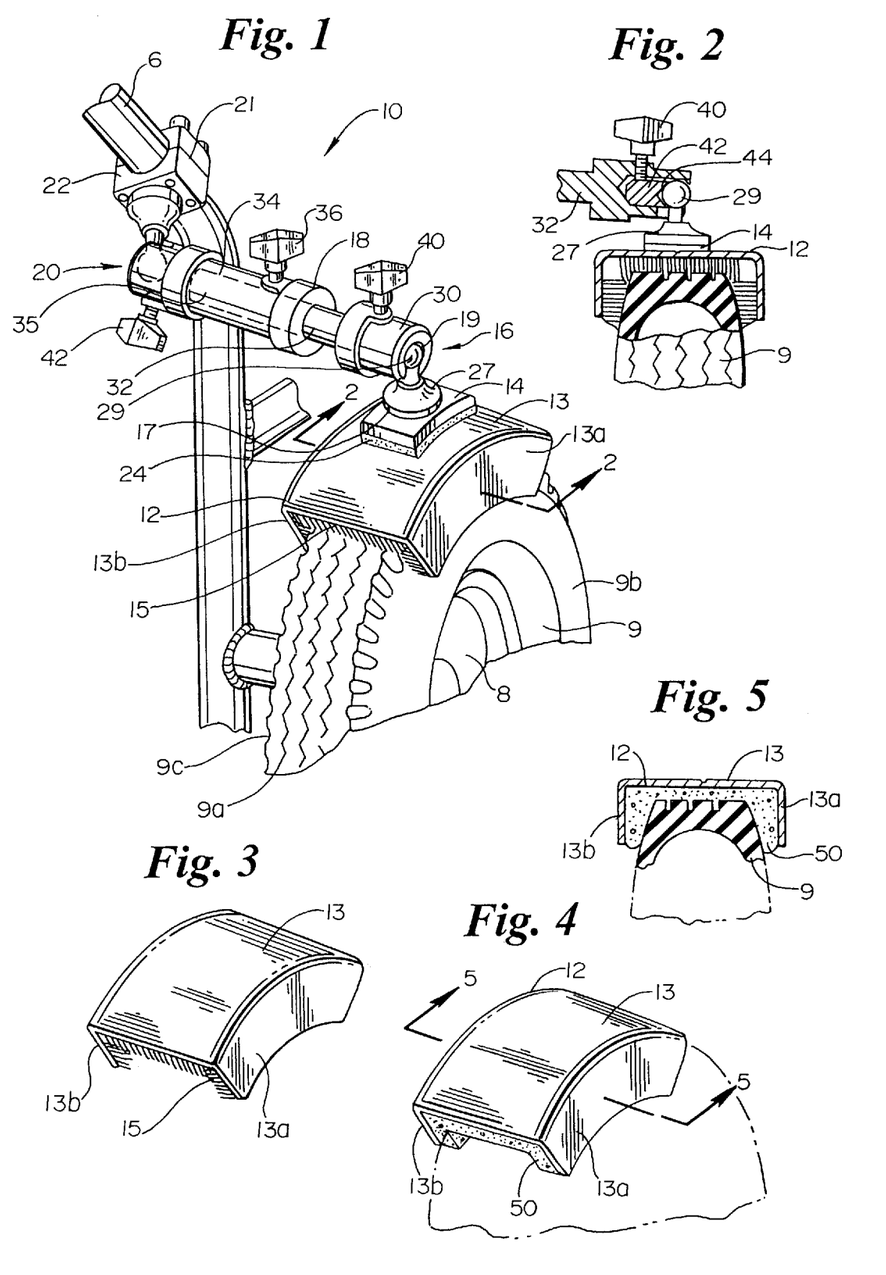
FIG. 1 is a fragmentary perspective view of the bristle embodiment of the invention shown in use.
FIG. 2 is a sectional view taken along the line 2—2 of FIG. 1.
FIG. 3 is a perspective view showing the bristle embodiment in greater detail.
FIG. 4 is a perspective view showing the sponge embodiment of the present invention.
FIG. 5 is a fragmentary section view with a fragment of tire taken along line 5—5 of FIG. 4.

FIG. 1 is a fragmentary perspective view of the bristle brush embodiment of the invention shown in use. A cleaning device assembly 10 in accordance with the present invention is mounted on a vehicle frame 6 and used with a wheel 8, which includes tire 9. Cleaning device assembly 10 is comprised of a cartridge 12, shell 14, ball and socket joint 16, connecting rod 18, ball and socket joint 20, and frame clamp 22.

Cartridge 12 is adapted to fit over tire 9 in order to clean debris such as dirt, mud, gravel, and tar from a tread 9a and sidewalls 9b and 9c of tire 9. Cartridge 12 is comprised of a tread cover 13, which is curved and generally congruent with tire 9, and sidewalls 13a and 13b, which extend radially away from tread cover 13 and are adjacent to tire sidewalls 9b and 9c. In the embodiment shown, bristle brush 15 is fixedly secured to inner surfaces of tread cover 13 and sidewalls 13a and 13b for frictionally contacting tire 9. In this manner, the cartridge 12 fits snugly over tire 9, including tread 9a and tire sidewalls 9b and 9c, and when tire 9 is rotated, the bristle brush 15 scrubs the tire tread and sidewalls free of debris.

Figures 19, 20, 21:
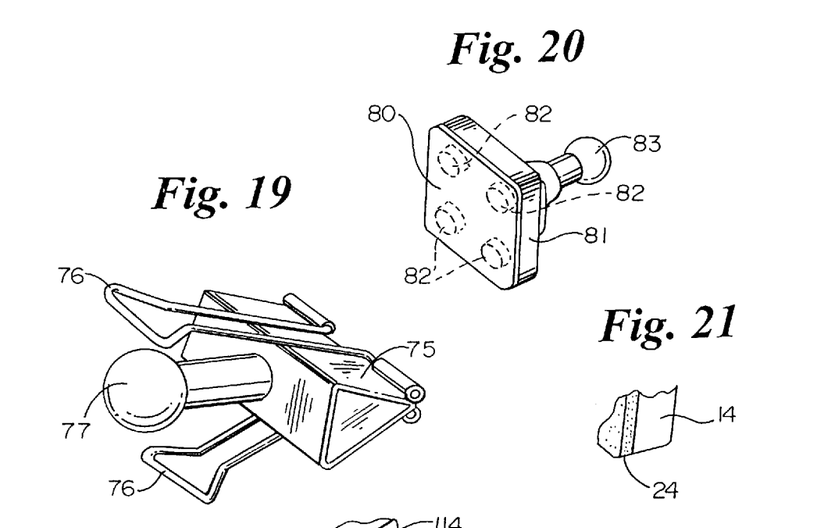
FIGS. 19 and 20 are a perspective view of an alternative attachment device for the present invention.
FIG. 21 is a fragmentary view of a shell of the present invention showing the use of an adhesive layer.
Figure 22:
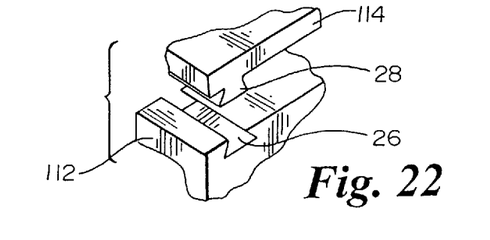
FIG. 22 is a fragmentary view of an alternative way to attach a cartridge of the present invention to a shell of the present invention.

Cartridge 12 is integrated in the cleaning device assembly 10 with shell 14. In the embodiment shown, shell 14 is disposably secured to cartridge 12 with adhesive 24. As shown in FIG. 21, adhesive 24 is applied between a cartridge (not shown) and shell 14 to securely hold the cartridge. The adhesive must be sufficiently sticky to withstand the frictional forces developed by the rotating tire, yet must allow for the cartridge to be removed and disposed of after use. Those skilled in the art will realize that other means can be used to disposably secure a cartridge to shell 14 without departing from the spirit and scope of this invention. For example, as shown in FIG. 22, a dovetail groove 26 which is generally parallel to the width of a tire can be formed in a surface of cartridge 112, which is adapted to receive a congruent dovetail ridge 28 formed on a surface of shell 114. By securing cartridge 112 to shell 14 with adhesive 24, or by engaging the dovetail groove 26 and the dovetail ridge 28, cartridge 112 is held firmly in place by shell 114 while tire 9 is spun around to clean the debris from the tire. Cartridge 12 is then removed and disposed of after use. The present invention also encompasses an embodiment wherein the cartridge 12 is fixedly secured to shell 14 with adhesive or other means, and the bristle brush 15 or other cleaning element (such as a sponge as described below and shown generally in FIG. 4) is disposably mounted to the cartridge 12. The cleaning element contains an adhesive sufficiently sticky to withstand the frictional forces developed by the rotating tire, yet must allow for the cleaning element to be removed and disposed of after use. The cleaning element is backed by a specially treated paper, similar to the material used in a finger bandage, and is applied to the cartridge prior to use of the cleaning device assembly 10.

The shell 14 and cartridge 12 combination is integrated into the cleaning device assembly 10 with ball member 27 which mates with ball and socket joint 16. Ball member 27 is secured to shell 14 at base 17, and is secured with ball 29 to connecting rod 18 at socket 19 on first end 30 of connecting rod 18. Ball and socket joint 16 allows shell 14 and cartridge 12 to be adjusted relative to connecting rod 18 to accommodate various configurations and alignments of tires. A fastener, such as finger screw 40, can be used to hold the shell 14 and cartridge 12 firmly in place once properly aligned over tire 9.

Connecting rod 18 can be extended along a longitudinal axis of the rod, and includes a first member 32 and a second member 34. Second member 34 includes a hollow chamber 35 which is of sufficient width to receive the first member 32. In this manner, first member 32 resides inside of second member 34, and is extended in order to vary the length of connecting rod 18. A fastener, such as finger screw 36, can be used to secure first member 32 to second member 34.

Connecting rod 18 is attached to the frame 6 of a vehicle with a coupling member, such as ball and socket joint 20 and frame clamp 22. The ball member of the ball and socket joint 20 is shown in phantom. Ball and socket joint 20 allows the connecting rod to be adjusted relative to frame 6 to accommodate various configurations and alignments of tires, and can be held firmly in place with a fastener, such as a finger screw 42, once connecting rod 18 is properly aligned. A spacer 21 can be used with frame clamp 22 to accommodate varying diameter widths of frame 6. For example, a large diameter frame clamp 22 in conjunction with thick, rubberized spacing tape applied directly to the frame 6 or to the inner surfaces of clamp 22 can be used to mount cleaning device assembly 10 to a vehicle that has a small diameter frame, such as wheel chairs or scooters. Those skilled in the art will recognize that other types of spacers, either alone or in combination, can be used to aid in securing clamp 22 to frame 6. For example, a foam substance of the type generally dispensed from an aerosol can may be used as a spacer. As shown in FIG. 1, clamp 22 is comprised of two pieces which have U-shaped, concave surfaces to accommodate a round frame tube. The pieces are clamped together with fasteners around the tube, with the spacer filling any extra space in the clamp 22.

FIG. 2 is a sectional detail view taken along the line 2—2 of FIG. 1, and shows the embodiment of the cleaning device assembly 10 in greater detail. Specifically, FIG. 2 shows the manner in which the shell 14 and cartridge 12 can be adjusted relative to each other. When finger screw 40 is tightened, pawl 42 is pressed against a bottom surface of first member 32. This causes an internal chamfer 44 of pawl 42 to contact ball 29 of ball member 27, and frictionally secures the ball 29 in place. In this manner, shell 14 and cartridge 12 are held in place after being positioned over tire 9, and while tire 9 is rotated to remove the debris.

FIG. 3 is a perspective view showing the bristle embodiment, and shows the tread cover 13, sidewalls 13a and 13b, and bristle brush 15 in greater detail.

FIG. 4 is a perspective view showing a sponge embodiment of a cartridge 12. Cartridge 12 includes tread cover 13 and sidewalls 13a and 13b which can be identical to those described above and shown in FIGS. 1–3. In this embodiment, however, cartridge 12 includes a sponge liner 50 mounted on the inner surfaces of tread cover 13 and sidewalls 13a and 13b for cleaning the debris from a tire of a vehicle.

FIG. 5 is a fragmentary section view taken along line 5–5 of FIG. 4 showing a fragment of a tire. FIG. 5 shows tire 9 surrounded by sponge liner 50, which is attached to tread cover 13 and sidewalls 13a and 13b of cartridge 12.

Figure 6:
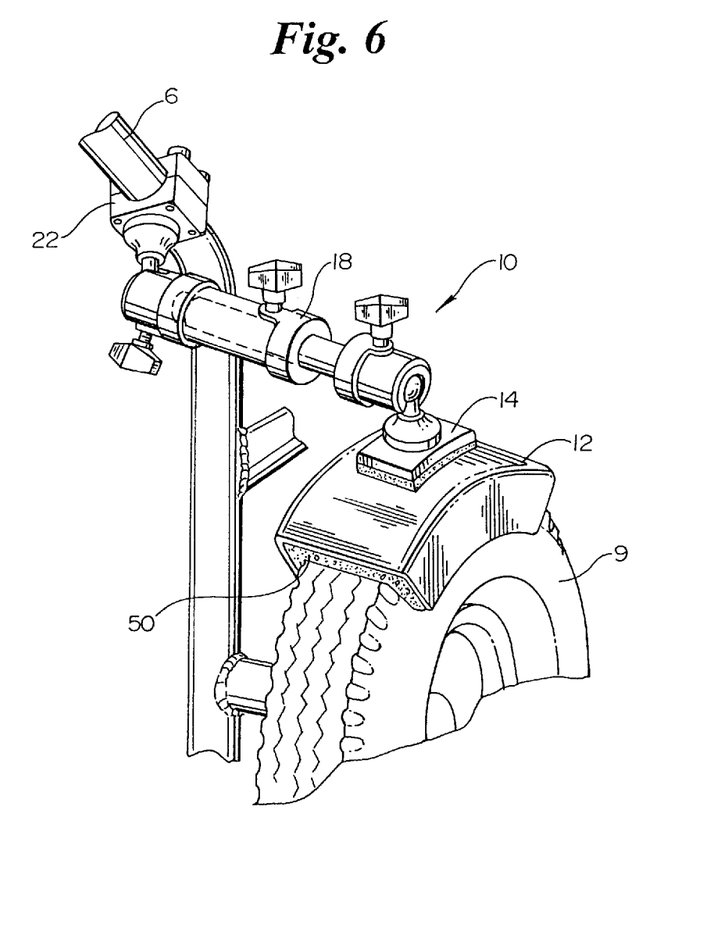
FIG. 6 is a fragmentary perspective view of a sponge embodiment shown in use.

FIG. 6 is a fragmentary perspective view of a sponge embodiment of a cleaning device assembly 10 shown in use. This embodiment can be identical to that shown in FIG. 1 and described above with the exception of the use of a sponge liner 50 in place of a bristle brush 15.

Figure 7:
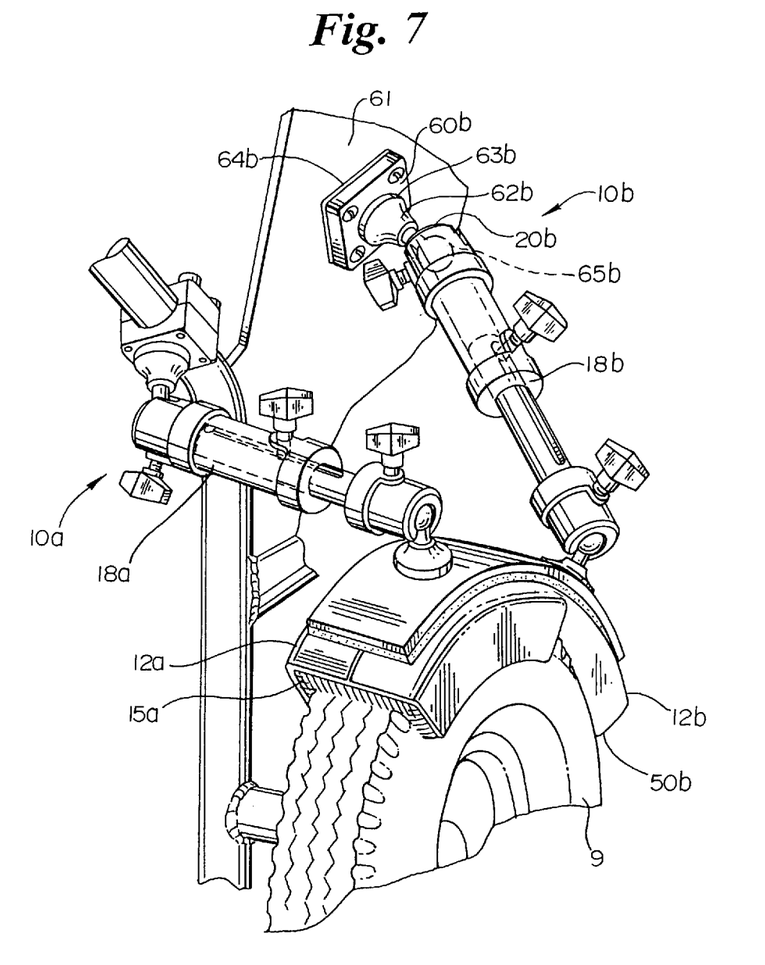
FIG. 7 is a fragmentary perspective view of both a bristle and a sponge embodiment in combination shown in use.

FIG. 7 is a fragmentary perspective view of a combined embodiment of the present invention shown in use. This embodiment includes two separate cleaning device assemblies 10a and 10b used in series with each other to more effectively remove debris from tire 9. Cleaning device assembly 10a includes a bristle brush cartridge 12a, and can be identical to the cleaning device assembly described above and shown in FIG. 1. Cleaning device assembly 10b includes sponge liner cartridge 12b, and can be identical to the cleaning device assembly described above and shown in FIG. 6 with the exception of mounting flange 60b. In the embodiment shown, cleaning device assembly 10b is mounted to a flat surface 61 of the vehicle with a mounting flange 60b. Base 63b of ball member 62b having a ball 65b (shown in phantom) is fixedly secured to mounting flange 60b, which is attached to surface 61 with fasteners or other conventional means, such as a layer of adhesive 64b. Ball member 62b mates with the ball and socket joint 20b of cleaning device 10b. This embodiment of the invention can be used on exceptionally dirty tires, or when an exceptionally clean tire is desired. When tire 9 is rotated in a clockwise direction, the bristle brush 15a of cleaning device assembly 10a first removes the majority of debris from tire 9. Any remaining debris is then removed by sponge liner 50b of cleaning device assembly 10b. In this manner, heavy layers of debris are removed.

FIGS. 8–15 demonstrate means for altering the cleaning device assembly to accommodate tires of various widths. Specifically, FIGS. 8–15 depict a means to vary the width of a cartridge used to remove debris from a tire.

Figure 8:
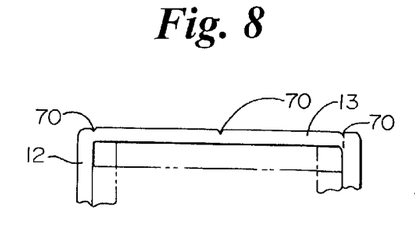
FIG. 8 is an end elevational view of a cartridge of the present invention with parts shown in phantom dashed line.

FIG. 8 is an end elevational diagram of a cartridge with parts (such as a bristle brush or sponge liner) shown in phantom dashed line. Grooves 70 are scored at both ends and in the center of tread cover 13. Grooves 70 allow cartridge 12 to be frangibly separated and used with other separated sections of cartridges in order to form cartridges of varying widths to accommodate tires of various widths.

Figure 9:
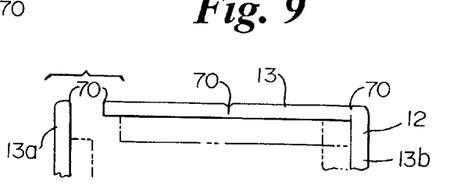
FIG. 9 is a view similar to that of FIG. 8 showing frangible separation of the cartridge.

FIG. 9 is a view similar to that of the prior figure showing a frangible separation of a cartridge 12 thereof Sidewall 13a is frangibly separated from tread cover 13, thereby enabling side wall 13a or tread cover 13 and sidewall 13b to be used in conjunction with similarly separated cartridges to accommodate a wide tire. To illustrate, cartridge 12 can be a standard two inches in width, with grooves 70 formed at either end and in the center (i.e. the one inch mark) of tread cover 13. When sidewall 13a is separated at groove 70 from each of two different cartridges, the remaining two inch sections of the cartridges can be attached to a single shell to create a four inch cartridge. This cartridge can then be used to remove debris from a four inch tire.

Figure 10:
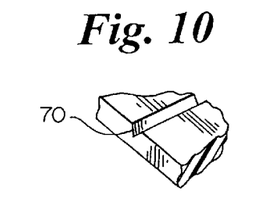
FIG. 10 is a fragmentary detailed perspective view of the cartridge shown in FIGS. 8 and 9 showing the scored grooves thereof.

FIG. 10 is a fragmentary detailed perspective view of the structure shown in FIGS. 8 and 9 showing the scored grooves 70 thereof.

Figure 11:
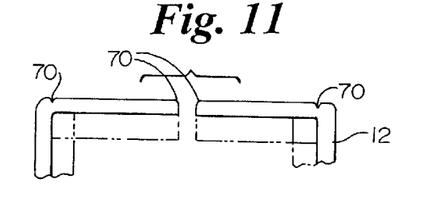
FIG. 11 is a view similar to that of FIG. 10 showing an alternative frangible separation of the cartridge.

FIG. 11 is a view similar to that of FIGS. 8–10 showing an alternative frangible separation thereof Cartridge 12 is separated along the center groove 70, thereby creating two one-inch cartridges for use in combination with other similarly separated cartridges.

Figure 12:
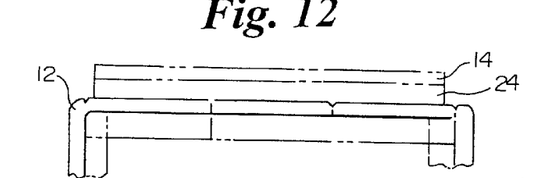
FIG. 12 is a view similar to that of FIGS. 9 and 10 showing an assembly of the cartridge of the present invention.

FIG. 12 is a view similar to that of FIGS. 9 and 10 showing an assembly thereof. The two inch section of cartridge 12 shown in FIG. 9 and the one inch section of FIG. 10 are shown secured to shell 14 with adhesive 24. In this manner, a three inch cartridge is created for use on a tire three inches in width.

Figure 13:
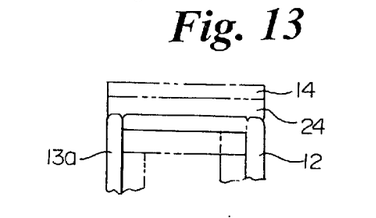
FIG. 13 is a view similar to that of the prior FIGS. 8 and 12 showing an alternative assembly of the cartridge.

FIG. 13 is a view similar to that of prior FIGS. 8 and 12 showing an alternative assembly of a cartridge thereof The sidewall 13a of FIG. 9 and a one inch section of FIG. 11 are secured to shell 14 with adhesive 24 to create a one inch cartridge for cleaning tires one inch in width.

Figure 14:
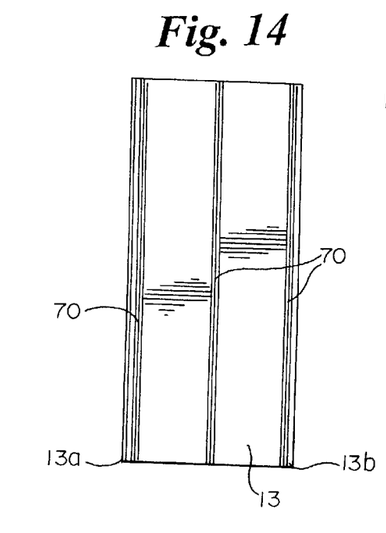
FIG. 14 is a top plan view of the cartridge of the present invention.

FIG. 14 is a top plan view of the cleaning assembly, showing tread cover 13, sidewall covers 13a and 13b, and grooves 70 scored in the assembly.

Figure 15:
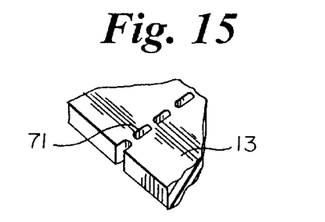
FIG. 15 is a fragmentary perspective detail of a cartridge similar to that of FIG. 10 showing an alternative embodiment thereof.

FIG. 15 is a fragmentary perspective detail of a tread cover 13 similar to FIG. 10, but showing instead an alternative method for frangibly separating tread cover 13. Perforations 71 are made in tread cover 13, and the cover can be separated along these perforations to create cartridges of various widths.

While the cartridges shown in FIGS. 9–15 have been described as being of a specified dimension, those skilled in the art will recognize that these dimensions are used as examples only, and that the cartridges of the present invention, and the grooves that allow the frangible separation of these cartridges, can be of varying widths without departing from the spirit and scope of the invention.

Figure 16:
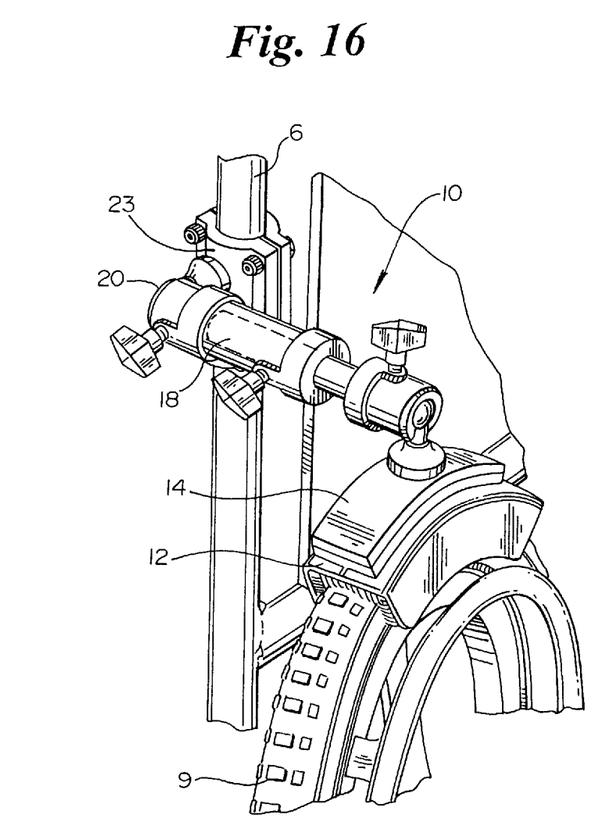
FIG. 16 is a perspective view of an alternative embodiment of the present invention thereof.

FIG. 16 is a perspective view of an alternative embodiment of the cleaning device assembly adapted for use with a vehicle with narrow tires such as a wheelchair. The cleaning device assembly 10 is similar to that described above and shown in FIGS. 1 and 6. In the embodiment shown, a clamshell clamp 23 is mounted to frame 6 of the vehicle and secured to connecting rod 18 with ball and socket joint 20. Clamshell clamp 23 includes two U-shaped concave surfaces for mounting the clamp to round frame 6 with conventional fasteners.

Figure 17:
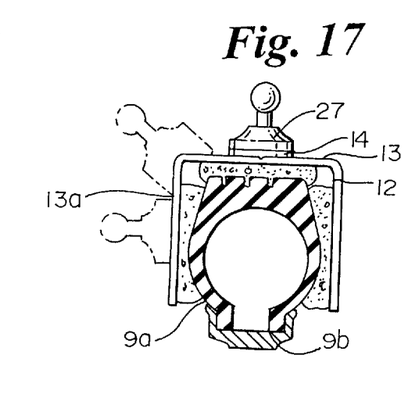
FIG. 17 is a view similar to that of FIGS. 2 and 5 showing an alternative embodiment thereof.
Figure 18:
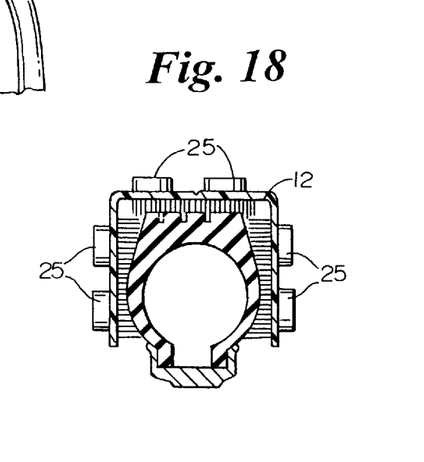
FIG. 18 is a view similar to that of FIG. 17 showing a further alternative embodiment thereof.

FIGS. 17 and 18 depict alternative means for mounting the cartridge 12 and shell 14 to a cleaning device assembly and connecting rod. FIG. 17 is a view similar to that of FIGS. 2 and 5 showing an alternative embodiment thereof A cartridge 12 is shown in use with a balloon-type tire 9a mounted on a rim 9b. Ball member 27 is shown mounted on shell 14 on top of the tread cover 13, similar to FIG. 2. Ball member 27 is also depicted in phantom dashed lines alternatively mounted on sidewall 13a or on a corner of the cartridge 12. FIG. 18 is a view similar to that of FIG. 17 showing a further alternative embodiment thereof wherein rare earth magnets 25 are used to integrate cartridge 12 into the cleaning device assembly. This particular embodiment is particularly useful in a clean environment setting (i.e. using the invention on carts that bear medical supplies). Magnets 25 are secured to the cartridge 12, which then can be affixed to flat, metallic surfaces of a vehicle through conventional magnetic forces.

FIGS. 19 and 20 depict alternative means for mounting a cleaning device assembly in accordance with the present invention to a vehicle. FIG. 19 is a perspective view of a triangular spring ball clamp 75 for use in attaching a cleaning device assembly to a generally planar portion of a frame or a generally planar plate of a vehicle. Triangular spring ball clamp 75 is attached to front and back surfaces of a flat plate or frame by squeezing clamp arms 76 together and sliding the clamp onto the frame or surface in a manner similar to the operation of a conventional binder clip. Ball 77 of triangular spring ball clamp 75 then mates with a ball and socket joint of a connecting rod as described above and shown in FIGS. 1 and 6 in order to fixedly secure a cleaning device assembly to the vehicle. Those skilled in the art will recognize that a "bulldog" spring clamp can also be used in a similar fashion for attaching a cleaning device assembly to a tubular or generally spherical frame. A bulldog spring clamp operates similar to a triangular spring clamp in that it is comprised of clamp arms and a ball for mounting a connecting rod, but is generally cylindrical in shape for attachment to tubular frames. Similarly, a hinged SNAP-TITE brand spring clamp such as that commercially produced by Quickie, a division of Sunrise Medical, could be adapted for mounting a cleaning device assembly to a tubular frame of a vehicle.

FIG. 20 is a perspective view of a mounting flange 80 similar to that shown in use with cleaning device assembly 10b in FIG. 7. In the embodiment shown, mounting flange 80 includes a base 81 and ball 83 for connection with the ball and socket joint of a connecting rod. Magnets 82 shown in phantom dashed line are embedded within the base 81, and fixedly secure the mounting flange 80 a to metallic surface of a vehicle frame member through conventional magnetic forces.

Although the present invention has been described with reference to preferred embodiments, workers skilled in the art will recognize that changes may be made in form and detail without departing from the spirit and scope of the invention.

What is claimed is:

1. A cleaning device assembly for removing debris from a tire on a vehicle, comprising:
   a cartridge congruent with the vehicle tire, including a cleaning element for frictionally removing debris from the tire;
   a shell mounted on the cartridge;
   a longitudinally extendible rod, including:
      a first elongated member attached to the shell; and
      a second elongated member having a hollow chamber along a longitudinal axis of the member, wherein the second elongated member is adapted to receive the first member in the hollow chamber;
   a fastener for securing the first elongated member and the second elongated member together; and
   a coupling for securing the rod to the vehicle.

2. The cleaning device assembly of claim 1 wherein the cartridge includes a tread cover and two opposing sidewall covers that are substantially perpendicular to the tread cover, the cleaning element being attached to an inner surface of the tread cover and the sidewall covers.

3. The cleaning device assembly of claim 1 further comprising a first ball and socket joint interconnected between the first elongated member of the extendible rod and the shell for adjusting the shell and the cartridge relative to the first elongated member.

4. The cleaning device assembly of claim 1 wherein the coupling is a frame clamp secured to a frame member of the vehicle and attached to the second elongated member of the rod.

5. The cleaning device assembly of claim 4 wherein the frame clamp includes a spacer member for accommodating varying widths of the frame member of the vehicle.

6. The cleaning device assembly of claim 1 wherein the coupling includes a second ball and socket joint interconnected between the vehicle and the second elongated member of the rod for adjusting the cleaning device assembly relative to the vehicle.

7. The cleaning device assembly of claim 6 wherein the second ball and socket joint includes:

a mounting flange that is fixedly secured to a surface of the vehicle; and a ball member that mates with a recess in the second elongated member.

8. The cleaning device assembly of claim 7 wherein the mounting flange includes a layer of adhesive for securing the plate to the surface of the vehicle.

9. The cleaning device assembly of claim 8 wherein the mounting flange includes one or more magnets for securing the plate to the surface of the vehicle.

10. The cleaning device assembly of claim 1 further including:

a dovetail groove in a surface of the cartridge that extends in a direction generally parallel to the width of the vehicle tire; and a dovetail rail on a surface of the shell that extends in a direction generally parallel to the width of the vehicle tire, the dovetail rail being adapted to engage the dovetail groove for securing the cartridge to the shell.

11. The cleaning device assembly of claim 1 further including a layer of adhesive between the cartridge and the shell for bonding the cartridge to the shell.

12. The cleaning device assembly of claim 1 wherein the cleaning element is a bristle brush.

13. The cleaning device assembly of claim 1 wherein the cleaning element is a sponge.

14. The cleaning device assembly of claim 1 wherein the cleaning element is disposably mounted in the cartridge.

15. The cleaning device assembly of claim 1 wherein the cartridge includes frangible perforations that extend along a longitudinal axis of the cartridge for accommodating variations in the width of the tire.

16. The cleaning device assembly of claim 1 wherein the cartridge includes frangible grooves scored in a surface of the cartridge that extend along a longitudinal axis of the cartridge for accommodating variations in the width of the tire.

* * * * *